June 27, 1933.  F. C. HOBLER  1,915,933
WEAR COMPENSATING BEARING
Filed April 15, 1932
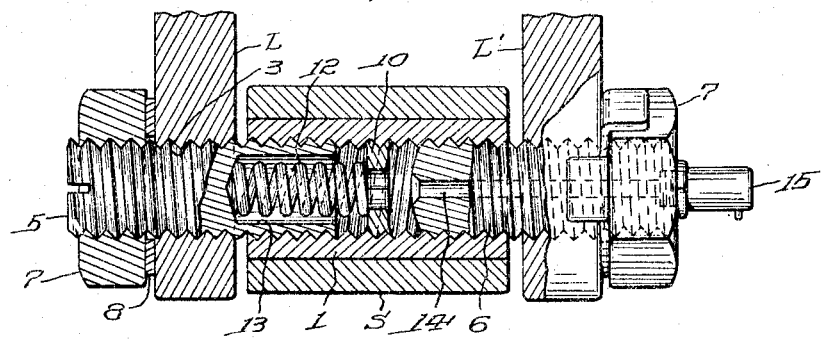
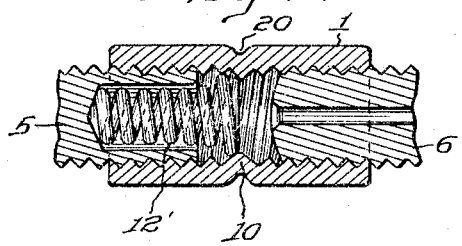
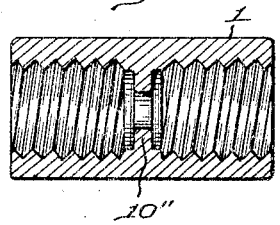
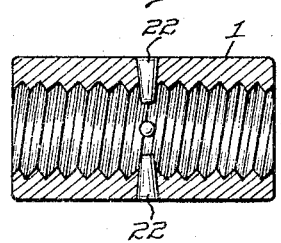
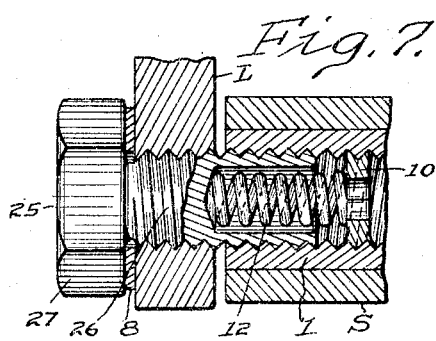
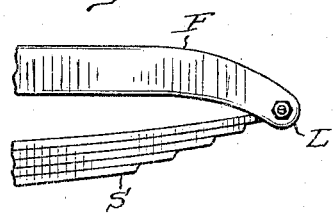
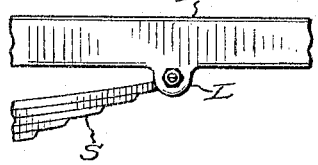
WITNESS
F. J. Hartman.
INVENTOR
Frank C. Hobler.
BY George K. Hilbert
ATTORNEY Patented June 27, 1933

1,915,933

UNITED STATES PATENT OFFICE

FRANK C. HOBLER, OF ELMIRA, NEW YORK

WEAR COMPENSATING BEARING

Application filed April 15, 1932. Serial No. 605,450.

The principal object of the present invention is to provide a wear compensating bearing suitable for forming an operative connection between two relatively movable members and adapted to automotically compensate for and take up such wear as may occur between the relatively moving bearing surfaces so as to eliminate looseness or lost motion and constantly preserve a proper bearing engagement therebetween.

My improved wear compensating bearing is therefore capable of numerous and varied uses and applications, but is particularly adapted for installation at various points in an automobile such, for example, at the point of attachment of the forward ends of the springs to the frame or in the steering knuckles or front axle spindle bearings or at the points of connection of the cross tie rods with the steering arms of the steering mechanism, as will be readily apparent to those skilled in the art to which the invention relates.

For convenience of description, therefore, but not by way of limitation or restriction, I shall herein refer more particularly to the employment of the bearing as a connecting medium between the front ends of the front or rear springs of an automobile and the frame thereof, the bearing in such instances being employed in place of the usual bolts which extend through the laterally spaced ears of the spring horn at the front end of the side frame member and through the spring eye bushing of the front spring disposed between them, or through the laterally spaced depending ears of a spring hanger secured to the side frame member and the spring eye bushing of the rear spring disposed between them.

In addition to the aforesaid principal object of my invention, further objects thereof are to provide a wear compensating bearing affording adequate bearing area between the relatively moving bearing surfaces and one in which the parts are of sufficient size to give the strength requisite to sustain the required load without increasing the external dimensions of the parts to a point which would prevent the use of the bearing in automobiles or other machinery designed for the plain bearings ordinarily employed at those points at which my improved bearing may desirably be utilized, thus enabling the latter to be installed as factory equipment on new cars or as replacements on old cars without the necessity of material alteration or modification of their design.

A still further object of the invention is to provide a wear compensating bearing of simple form and construction comprising but a relatively small number of parts of a character suitable for efficient and economical manufacture, thus permitting the bearing to be employed without material increase in cost over the plain bearings ordinarily utilized at similar points, and to provide a bearing, which can be readily assembled with the parts with which it is designed to be operatively associated, in which the degree of frictional contact between the relatively movable elements may be readily adjusted to a predetermined or other value.

A still further object of the invention is the provision of a wear compensating bearing so constructed and arranged that lubricant need be supplied at only relatively infrequent intervals in order to maintain the wearing surfaces in properly lubricated condition.

My invention further includes other objects and novel features of design, construction and arrangement hereinafter more particularly mentioned or which will be apparent from the accompanying drawing in which I have illustrated a bearing constructed in accordance with the principles of the invention as well as a slightly modified form thereof and certain modified forms of the bushing which constitutes a component part of the bearing.

In the said drawing, Fig. 1 is a vertical central section with certain parts in elevation showing the bearing installed as the connecting medium between an end of one of the springs of an automobile and the spring horn or spring hanger of the frame thereof; Fig. 2 is a central section, partially fragmentary, of a modified form of the bearing bushing and associated parts, and Figs. 3 and 4 are respectively central longitudinal sections of still other forms of bushings which may be used in the bearing assembly. Fig. 5 is a fragmentary side elevation on a reduced scale showing the front end of an automobile frame and the front end of the forward spring connected therewith by the bearing shown in the preceding figures; Fig. 6 is a similar view showing the forward end of the rear spring similarly connected to a hanger or bracket extending from the car frame, and Fig. 7 is a fragmentary vertical central section generally corresponding to Fig. 1, but showing the slightly modified construction to which I have referred. Like symbols are used to designate the same parts in the several figures.

Referring now more particularly to Fig. 1 of the drawing, L—L' represent laterally spaced depending ears or lugs forming integral parts of or permanently attached to the frame F between which the eye of the spring S is disposed. The lugs L—L' may thus be considered as typical of any rigid member or element to which another element, typified by the spring S, is to be connected through the medium of the wear compensating bearing of my invention in such manner as to be capable of relative movement with respect thereto. Thus, for example, the lugs L—L' might be a portion of the yoke at the end of an automobile axle, and the part S the steering spindle from which extends the stub axle on which the wheel is journaled, or L—L' might typify the yoke at the end of the cross tie rod of the steering mechanism and S a portion of the steering arm, as will be readily understood.

Within the spring eye there is preferably disposed a hollow bushing 1, desirably externally cylindrical, which is pressed or otherwise disposed in the spring eye or other analogous part so as to be operatively rigid therewith. This bushing is internally threaded, and in the form of the invention now being described the threads are carried entirely through the bushing from one end to the other and are preferably fairly coarse, though the particular pitch and size of the thread is a matter of choice. Usually, an ordinary V-type thread is preferred, but other forms of threads may in certain instances be employed, and under certain conditions the bushing may be omitted and the threads formed directly in the spring eye or other part normally receiving the bushing.

Each of the ears or lugs L—L' is correspondingly bored and threaded as at 3 with the bores in axial alignment with each other and, during assembly, externally threaded studs generally designated as 5, 6 are respectively screwed oppositely inwardly through the bores and into the opposite end of the bushing disposed between the lugs and in axial alignment with the bores, the threads on the studs of course corresponding in size and pitch with those in the bushing. The length of these studs is so determined that their inner ends lie in spaced relation within the bushing, while their outer ends project far enough beyond the outer faces of the lugs to receive lock nuts 7 which may be prevented from backing off by lock washers 8 of suitable construction or, in fact, by any other means adequate for the purpose. After the parts are properly assembled as hereinafter described, these lock nuts are set up tightly so as to prevent the studs from backing out of the lugs or otherwise departing from their properly adjusted position, the lock washers or other locking means in turn insuring the lock nuts remaining in place.

Preferably at the center of the bushing 1 is disposed an abutment 10 which may be formed in a variety of ways and which, for convenience, I term a seat. In the particular form of the invention now being described, this seat consists of a washer having a hole in its center and of such diameter and thickness that by inserting a tapered broach of square or triangular cross section in the hole in the washer, it can be readily screwed along the threads of the bushing from either end until it is brought to approximately central position therein, where it is then locked in position by driving the broach into the hole so as to expand the washer radially against the thread, thus permanently seating the washer in the bushing. While this is a convenient way of forming the seat in the bushing, any other suitable method may be employed if preferred while, as will hereafter more fully appear, the seat may be formed either by a washer as just described or in numerous other ways so long as it is of such character and so arranged in the bushing as to form an obstruction in its bore suitable for a purpose now to be described.

The function of the seat is to provide an abutment for one end of a coil spring 12 which extends outwardly from one face of the seat into a cavity 13 formed in the inner end of the stud adjacent that face of the seat. Thus, in Fig. 1, the cavity is shown as formed in the stud 5, but it might with equal facility be formed in the other stud 6 and the spring then arranged on the opposite side of the seat. This spring, when the parts are assembled, is always under a considerable compression, the exact amount of which is adjusted in accordance with the operating conditions desired, and it will thus be apparent that the spring constantly tends to force the bushing and eye of the spring S in which it is disposed away from the lug or ear L lying on that side of the assembly adjacent the spring.

It will moreover be apparent that the bushing 1 is capable of oscillation on the studs 5, 6 when the parts are operatively assembled, and as the bushing and eye of the spring S are operatively rigid and the studs correspondingly operatively rigidly disposed in the lugs L—L', the requisite oscillatory movement between the spring eye and the lugs can thus take place about the central axis of the lugs, the faces of the threads on the studs bearing against corresponding faces of the threads in the bushing and forming the wearing surfaces on which this movement takes place. As the cooperating faces of the threads gradually wear while the bearing is in use, the spring 12 is effective to automatically compensate for such wear by constantly urging the bushing away from the adjacent lug, thus continuously maintaining a proper bearing engagement between the cooperative thread faces in the bushing and on the studs, preventing any looseness and consequent rattling, and minimizing wear by avoidance of lost motion or play between the relatively moving parts throughout the life of the shackle. As the bearing area or surface afforded by the cooperative faces of the threads is relatively great in comparison to the size of the parts, the normal wear is also correspondingly lessened because of distribution over a wide surface, while as the angularity of the threads is slight and as the arc through which the bushing turns from one limit position to the other under normal conditions of operation is not large, the endwise movement of the bushing relatively to the lugs L—L' as a whole is negligible.

In assembling the parts, the seat is first arranged in the bushing and the latter then forced into the eye of the spring in the usual way. The spring eye is then positioned between the lugs L—L' and the stud 6 screwed into place, a spacing tool being preferably inserted between the end of the eye and inner face of the lug so as to locate the former a proper distance from the latter. The stud is screwed in until its inner end approaches but preferably does not coincide with the seat, the lock washer 8 is then slipped over the end of the stud, and the lock nut 7 screwed into place and the washer bent over it. The spring 12 is next inserted in the bore or cavity 13 in the inner end of the stud 5 and the latter screwed inwardly through the lug L until the inner end of the spring abuts the adjacent face of the seat. Further inward movement of the stud now becomes effective to compress the spring, and this movement is preferably continued until the spring is fully compressed, after which the stud is backed off for such given number of turns or portions thereof as has been previously determined will place the spring under the desired compression; the lock washer is then slipped over the end of the stud and the lock nut screwed on and locked in place.

It will of course be apparent that the greater the compression of the spring 12 the greater will be the friction between the cooperative faces of the threads and the greater the resistance correspondingly afforded to the oscillation of the bushing on the studs; therefore, when the several parts of the bearing are produced in quantities for a given installation and springs 12 of substantially uniform strength provided, it can readily be determined by trial just how many turns or parts thereof the stud associated with the spring should be backed off after the latter has been fully compressed during assembly in order to provide a certain amount of friction between the cooperative faces of the threads. When the bearing is used to form an operative connection between an automotive spring and frame, the riding qualities of the car as a whole are considerably influenced by the amount of this friction, for if it is too great the car will ride "hard". It is therefore desirable to initially determine by trial or otherwise the maximum suitable for the particular installation involved. After this has been done, it is only necessary, in order to obtain the same operating conditions in subsequent installations, to instruct the mechanic who assembles the bearings to back off the stud 5 for a certain number of turns or parts thereof after fully compressing the spring before locking the stud in place. This feature is of great advantage in the quantity production of automobiles for it enables the attainment of uniformity of frictional engagement in a plurality of similar bearings in a very simple way.

Preferably, one of the studs, for example the stud 6, may be axially drilled as at 14 to provide a grease passage leading to the interior of the bushing and a suitable grease or oil fitting 15 provided at the outer end of the passage to facilitate the introduction of grease or oil to the interior of the bushing; as the seat 10 is perforated, lubricant thus forced in from one end of the assembly can readily find its way to the opposite side of the seat and thence to the adjacent bearing surfaces formed by the threads so that the latter throughout their length are properly and continuously lubricated from the supply at the center of the bushing which can be replenished from time to time as required. Under certain conditions, the fitting and grease passage may be entirely omitted and the bushing packed with grease before the insertion of the studs, for as but very little grease is required for adequate lubrication of the threads, a supply initially introduced into the bushing in this way is frequently sufficient to last for a very long period, after which it may be readily renewed by taking out one of the studs.

It is of course preferable that the threads in both lugs be formed in the same operation so that they will be in perfect axial alignment and in such relative position to each other that a suitably threaded tool such as a tap or bolt can be readily screwed through them from the outer face of one lug to the corresponding face of the other. Thus, when the parts are assembled, there can be no binding or the like between the bushing and the studs which might possibly be the case if the threads were not properly aligned both axially and as to lead.

As wear takes place in my improved bearing between one face of the thread helix on each of the studs and the adjacent face of the helix within the bushing, it is compensated as already pointed out by the action of the spring 12 which continually maintains a full bearing engagement between said faces, and it is thus a matter of no moment that as this wear gradually increases, the opposite face of the thread helix on each stud and the corresponding or adjacent face of the thread helix in the bushing gradually tend to separate. Moreover, in many installations to which my bearing is applicable, and particularly when it is used as a connecting medium for the springs and hangers of automobiles, the weight of the body of the vehicle supported on the lugs L—L' tends to wear the bushing and pins below the plane of their axis to a greater degree than above that plane, and for this reason the bearing assemblies having continuous exteriorly threaded pins extended through interiorly threaded bushings which have heretofore been suggested are not satisfactory because the wear to which reference has just been made gradually tends to cause the upper part of the thread on the pin to separate from the adjacent thread in the bushing, thus giving rise to play with consequent rattling and excessive wear. In my improved bearing, however, the wear takes place on the inclined faces of the threads substantially equally above and below the bearing axis whichever be the direction of major vertical load, so that a snug bearing fit without play or looseness is insured at all times, the spring being of sufficient tension to maintain that condition and prevent any side slap or sway even though the opposite or non-bearing faces of the threads gradually separate upon the occurrence of material wear on the bearing faces. In this respect, among others, my improved wear compensating bearing affords a material advantage over the bearings employing continuous threaded pins and interiorly threaded bushings to which I have referred.

As hitherto stated, the seat forming means for the inner end of the spring 12 may be of any construction suitable therefor, and in Figs. 2, 3 and 4 I have illustrated various forms of seats which may, among others, be employed if preferred to the form already described. Thus, for example, the seat 10' in the bushing shown in Fig. 2 is formed by pressing an annular groove 20 in the outer surface of the bushing after the latter has been threaded, preferably about midway of its ends, so as to cause the metal on the inside of the bushing to be forced radially inward beyond the points of the thread and thus form an annular seat. With this arrangement, it is preferable to utilize a spring 12', the inner end of which is enlarged somewhat so as to properly engage the seat, the inner diameter of which is necessarily only a little less than that of the corresponding diameter of the bushing thread. In Fig. 3 I have shown another kind of seat consisting of an inwardly radially directed annular flange 10'' formed integrally with the body of the bushing approximately midway between its ends. As stated, this flange is desirably annular so as to provide an opening through which the lubricant may pass and, of course, when a seat of this character is employed, it is impossible to thread the bushing continuously from one end to the other so it becomes necessary to thread each end thereof separately. The radial width of the seat is a matter of choice, and can thus be formed as shown for the reception of a spring 12 of the character of that shown in Fig. 1 or of less radial width, in which case a spring having an enlarged end of the character of that shown in Fig. 2 is employed. Fig. 4 illustrates still another kind of seat formed by a plurality of pins 22, four being a convenient number, which, after the bushing is threaded, are driven inwardly through holes drilled in its body in annularly spaced relation so that the ends of the pins extend sufficiently into the bore of the bushing to form a seat for the end of the spring, the outer ends of the pins being smoothed off flush with the surface of the bushing so they will not interfere with the operation of seating it in the spring eye.

Fig. 7 illustrates a slightly modified construction which, under certain circumstances, may be preferred as it is ordinarily somewhat cheaper to manufacture than the form of bearing shown in Fig. 1 although not possessing all of the inherent advantages of the latter. In this construction, instead of employing the studs 5, 6 externally threaded throughout their respective lengths and adapted for the reception of the lock nuts 7 on their outer ends, studs 25 having threaded bodies 26 and integral heads 27 are utilized, the inner end of one stud being bored out for the reception of the spring 12 and the opposite stud (not shown in Fig. 7) being desirable axially drilled to form a grease passage in the manner already described. The studs 25 utilized in this construction are therefore in the nature of cap screws and after assembly are prevented from backing off by any suitable means such as lock washers 8 to which reference has already been made. It will be apparent that in this construction adjustment of the spring tension cannot be effected in the manner described in connection with the form of the invention shown in Fig. 1, as it is necessary when assembling the bearing to set up the heads of the studs against the faces of the members L, L' or of the lock washer 8 if employed, thus substantially predetermining the position of the stud adjacent the spring 12 with respect to the other parts of the bearing in any given assembly. However, by properly proportioning the various elements and utilizing springs of substantially uniform tension, virtually the same spring tension can readily be produced in a series of installations, while of course by using washers or shims of different thickness under the head of the stud adjacent the spring, a limited capacity for spring tension adjustment is afforded. It will further be apparent that any form of bushing which would be suitable for use in the assembly shown in Fig. 1 may be utilized with equal facility in that to which reference has been made.

While I have illustrated and described two embodiments of my invention with considerable particularity as well as certain bushings having various kinds of seats which may be utilized therein, I do not thereby desire or intend to confine or restrict myself specifically thereto as modifications may be made in the form, construction and arrangement of the various parts to adapt the bearing to various uses and/or conditions of installation without departing from the spirit and scope of the invention as defined in the appended claims.

Having thus described my invention, I claim and desire to protect by Letters Patent of the United States:

1. In combination with relatively movable members, a wear compensating bearing forming a connection therebetween and comprising an internally threaded bushing rigidly seated in one of said members, externally threaded studs carried by the other member extending oppositely inwardly into said bushing, the inner ends of the studs being in spaced relation therein, a compression spring seating at one end against one of said studs, and means within the bushing between said studs forming a seat for the other end of said spring.

2. In combination with relatively movable members, a wear compensating bearing forming a connection therebetween and comprising a bushing rigidly seated in one of said members and having internal threads extending inwardly from its ends, externally threaded studs extending through and operatively fixed in the other member on opposite sides of the bushing and having their ends respectively threaded into the opposite ends of the bushing and terminating in spaced relation therein, a spring under compression extending within the bushing and bearing at one end on one of the studs, and means between the inner ends of the studs and carried by the bushing forming a seat for the other end of the spring, whereby the spring is effective to continuously urge the bushing in a predetermined direction with respect to the studs to maintain bearing engagement between one face of the threads on the studs and the adjacent face of the thread on the bushing.

3. In combination with relatively movable members, a wear compensating bearing forming a connection therebetween and comprising a bushing rigidly seated in one of said members and having internal threads extending oppositely inward from its ends, a pair of externally threaded studs carried by the other member with their inner ends respectively extending into the opposite ends of the bushing, means for restraining the studs from rotation in said other member under operative conditions, a spring under compression seating at one end against one of said studs, and means within and carried by the bushing between the inner ends of the studs forming a seat for the other end of the spring.

4. In combination with relatively movable members, a wear compensating bearing forming a connection therebetween and comprising an internally threaded bushing rigidly seated in one of said members, means within the bushing adapted to form a seat for one end of a spring, a pair of externally threaded studs carried by and threaded into the other member in axial alignment with each other, the inner threaded ends of the studs extending into the opposite ends of the bushing, the inner end of one of said studs being provided with an axial chamber, means operative to restrain the studs from rotation in said other member under operative conditions and a spring normally under compression extending within said chamber, one end of said spring seating on the bottom of the chamber and the other end thereof against said seat forming means, whereby the spring is effective to continuously urge the bushing in a predetermined direction with respect to the studs to maintain constant bearing engagement between one face of the threads on the studs and the adjacent face of the threads in the bushing.

5. In combination with relatively movable members, a wear compensating bearing forming a connection therebetween and comprising an internally threaded bushing rigidly seated in one of said members, means rigidly disposed within the bushing adapted to form a spring seat therein at a point intermediate its ends and arranged to permit the passage of lubricant from one side of said means to the other, a pair of externally threaded studs threaded through the other member and extending oppositely inwardly into the opposite ends of the bushing to cooperate with the threads therein, one of said studs having an axial chamber at its inner end, means cooperating with each stud to prevent rotation thereof in said other member under normal operating conditions, and a spring normally under compression extending in said chamber and seating at one end against the bottom thereof and at the other against said seat forming means, said spring being effective to constantly urge the bushing in a predetermined direction with respect to the studs to maintain one face of the threads on the latter in constant bearing engagement with the adjacent face of the threads in the bushing.

6. A wear compensating bearing assembly comprising an internally threaded member, a seat within and intermediate the ends of said member, a second member intended for relative movement with respect to the first member, a pair of studs supported by the second member having externally threaded ends respectively extending into the first member, and a spring normally under compression interposed between one of said studs and said seat.

7. A wear compensating bearing assembly comprising a member having an internally threaded bore, seat forming means in said bore intermediate the ends of the member, a second member intended for relative oscillation with respect to the first member; a pair of studs having externally threaded ends respectively extending into the opposite ends of the threaded bore in the first member, and a coil spring normally under compression interposed between one of said studs and said means.

8. In a wear compensating bearing, an internally threaded bushing, a pair of externally threaded studs extending into opposite ends of the bushing, means within and rigid with the bushing forming a spring seat between said ends, and a spring interposed between one of the studs and said means.

9. In a wear compensating bearing, an internally threaded bushing, a pair of externally threaded studs having their inner ends extending into the opposite ends of the bushing, means within the bushing intermediate its ends adapted to form a seat for a spring, said means providing an opening through which lubricant can pass from one side of said means to the other, and a coil spring interposed between one of said studs and said seat forming means.

In witness whereof I have hereunto set my hand this 13th day of April, 1932.

FRANK C. HOBLER.